United States Patent [19]

Nishiyama

[11] Patent Number: 5,067,791

[45] Date of Patent: Nov. 26, 1991

[54] FIBER IDENTIFICATION IN AN OPTICAL FIBER COMPOSITE OVERHEAD GROUND WIRE

[75] Inventor: Satoshi Nishiyama, Kanagawa, Japan

[73] Assignee: Sumitomo Electric Industries, Ltd., Osaka, Japan

[21] Appl. No.: 48,113

[22] Filed: May 11, 1987

[30] Foreign Application Priority Data

May 10, 1986 [JP] Japan .............................. 61-70558[U]

[52] U.S. Cl. ..................................................... 385/101
[51] Int. Cl.$^5$ ............................................. G02B 6/44
[58] Field of Search ........................... 350/96.22, 96.23

[56] References Cited

U.S. PATENT DOCUMENTS

| 4,235,511 | 11/1980 | Yonechi | 350/96.23 |
| 4,671,610 | 6/1987 | Kitayama et al. | 350/96.23 |
| 4,693,551 | 9/1987 | Blanco et al. | 350/96.23 |
| 4,696,541 | 9/1987 | Haag et al. | 350/96.23 |
| 4,701,015 | 10/1987 | Saito et al. | 350/96.23 |

FOREIGN PATENT DOCUMENTS

| 0015425 | 9/1980 | European Pat. Off. . |
| 0146757 | 7/1985 | European Pat. Off. . |
| 2302662 | 7/1974 | Fed. Rep. of Germany . |
| 3200760 | 7/1983 | Fed. Rep. of Germany . |

*Primary Examiner*—Akm Ullah
*Attorney, Agent, or Firm*—Sughrue, Mion, Zinn, Macpeak & Seas

[57] ABSTRACT

An optical fiber composite overhead ground wire in which a plurality of optical fibers are wound together on a tension member to form an optical unit. A plurality of such optical units are disposed in a spacer around which ground wires are wound. The optical fibers within a unit are identified by color and possibly winding order. Each tension member is also identified from other tension members so each optical fiber can be uniquely identified.

5 Claims, 2 Drawing Sheets

FIBER IDENTIFICATION IN AN OPTICAL FIBER COMPOSITE OVERHEAD GROUND WIRE

BACKGROUND OF THE INVENTION

1. Field of the Invention

The present invention relates to identifying the optical fibers of an optical fiber composite overhead ground wire (OPGW) made of a ground wire and the optical fibers.

2. Background of the Invention

An optical fiber composite overhead ground wire is shown in FIG. 1 and comprises optical fiber units 20 (each made of one or more optical fibers). A grooved spacer 21 made of aluminum or plastic contains the optical units 21. The spacer is contained in an aluminum tube 22. Aluminum wires or aluminum-coated steel wires 23 are wound on the aluminum tube 22.

For example, six optical fibers of an optical fiber composite overhead ground wire are included in each of two optical fiber units and are laid on a central tension member 30 as shown in FIGS. 2, 3 and 4. Each of the twelve resultant optical fibers is conventionally identified by one of the three following methods.

(1) Twelve different colors 1, 2, 3, 4, 5, 6, 7, 8, 9, 10, 11 and 12 are provided on the twelve optical fibers, as shown in FIG. 2, for identification. This is an all-color differentiation system.

(2) The two optical fiber units are identified by the difference between colors 2 and 3 of fibers contained respectively therein, as shown in FIG. 3. The remaining optical fibers of each of the optical fiber units are identified by counting in the direction of 1 to 2 and 1 to 3. This is a tracer system.

(3) The mutually-corresponding optical fibers of the two optical fiber units are provided with the same colors 1 through 6 and the two units are identified by tapes or sheaths 31 having different colors and wound or fitted on the units, as shown in FIG. 4. This is the unit color differentiation system.

In the all-color differentiation system, it is easy to identify the optical fibers but twelve colors are needed, thus increasing the cost.

In the tracer system, only four colors are needed for all the optical fibers and therefore this system yields a lower cost. However, it is inefficient to identify and count the optical fibers in field work because the diameter of each of the optical fibers is as small as 0.25 to 0.9 mm and the same color 4 is used for a large number of optical fibers.

In the unit color differentiation system, it is not inefficient to identify the optical fibers because the optical fiber units are identified by the different colors and the optical fibers of each of the units are then identified by different colors. However, since the tapes or sheaths 31 having the different colors are provided, the number of manufacturing steps and the cost of the cable are increased.

Although the unit color differentiation system is adopted for most of optical fiber composite overhead ground wires now, the system has the above-mentioned problems which increase the number of manufacturing steps and the cost of the cable.

SUMMARY OF THE INVENTION

Accordingly, an object of the present invention is to provide an optical fiber composite overhead ground wire in which the separate fibers in multiple units can be easily identified and yet be inexpensive.

According to the present invention, central tension members indispensable to the constitution of optical fiber units are provided with identification means in order to solve the problems of the unit color differentiation system.

Since the central tension members is indispensable to the construction of the optical fiber units, they may easily be provided with identification means for identifying the units. The process of manufacturing an optical fiber composite overhead ground wire is simplified and the cost thereof is reduced.

DETAILED DESCRIPTION OF THE PREFERRED EMBODIMENTS

Figure 5:
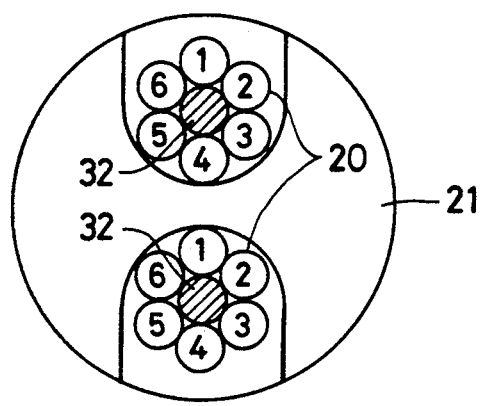
FIG. 5 shows a sectional view of an optical unit of an optical fiber composite overhead ground wire which is an embodiment of the present invention.

FIG. 5 shows a sectional view of part of an embodiment of the present invention, which is an optical fiber composite overhead ground wire having a grooved spacer.

Figure 6:
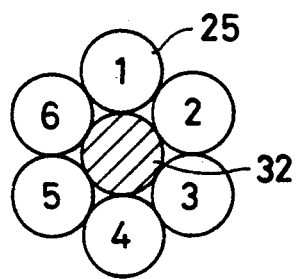
FIG. 6 shows an enlarged sectional view of a part of the cable.

FIG. 6 shows an enlarged sectional view of each of the optical fiber units of the cable.

Figure 1:
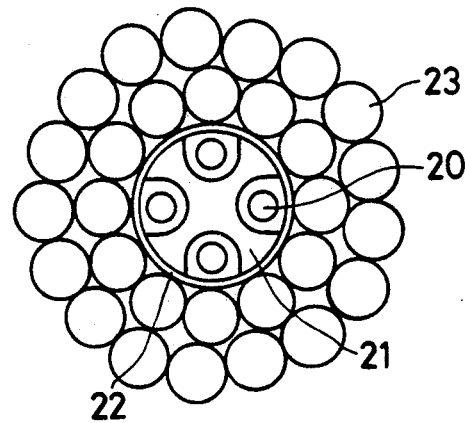
FIG. 1 is a sectional view of an optical fiber composite overhead ground wire.
Figure 2:
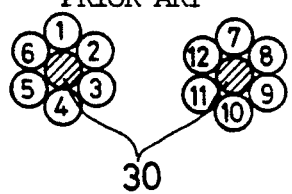
FIG. 2 shows a view for explaining an all-color differentiation system for identifying each of optical fibers.
Figure 3:
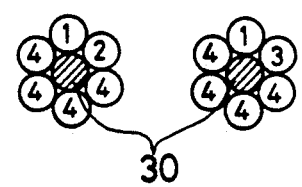
FIG. 3 shows a view for explaining a tracer system for identifying each of optical fibers.
Figure 4:
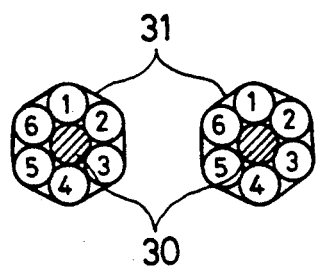
FIG. 4 shows a view for explaining a unit color differentiation system for identifying each of optical fibers.

Shown in FIGS. 5 and 6 are two optical fiber units 20 whose optical fibers have the same sequence of six colors. Both optical units 20 are placed in respective grooves of a grooved aluminum spacer 21. The tube 22 and electrical wires 23 of FIG. 1 surround the spacer 21. The six optical fibers in each unit have six mutually different colors 1 through 6 in this embodiment. However, generally, they do not need to have completely mutually different colors. The two central tension members 32 are differentiated from each other by identification means. These colors are provided by, for example, colored FRP.

According to the present invention, simple identification means are provided for central tension members indispensable to the constitution of optical fiber units, so as to enable the identification of each of the optical fiber units and that of each of optical fibers.

What is claimed is:

1. An optical fiber composite overhead ground wire, comprising:
   two or more optical fiber units bundled together; and
   a plurality of ground wires provided externally to said units, each of said optical fiber units comprising:
   a tension member; and
   a plurality of optical fibers wound on said tension member;
   wherein each of said tension members is uniquely identifiable for identifying said each tension member from any other of said plurality of tension members, and each of said optical fibers within said optical fiber unit is uniquely identifiable for identifying said each optical fiber from any other of said plurality of optical fibers within said optical fiber unit.

2. An optical fiber composite overhead ground wire as recited in claim 1, wherein said identifying means are visual identifying means.

3. An optical fiber composite overhead ground wire as recited in claim 2, wherein each said plurality of optical fibers includes a same second identifying means for identifying each optical fiber from any other optical fiber within one of said pluralities of optical fibers.

4. An optical fiber composite overhead ground wire as recited in claim 3, wherein said second identifying means includes a different color surface on each of said plurality of optical fibers.

5. An optical fiber composite overhead ground wire as recited in claim 1, further comprising:
 a spacer in which said optical units are disposed; and
 a tube, said plurality of ground wires wound exteriorly to said spacer.

* * * * *